United States Patent [19]

Philipp et al.

[11] Patent Number: 4,746,366

[45] Date of Patent: May 24, 1988

[54] PROCESS AND LACQUER FOR THE PRODUCTION OF SCRATCH-RESISTANT COATINGS

[75] Inventors: Gottfried Philipp, Kist; Helmut Schmidt, Höchberg, both of Fed. Rep. of Germany

[73] Assignee: Fraunhofer-Gesellschaft zur Förderung der Angewandten Forschung E.V., Munich, Fed. Rep. of Germany

[21] Appl. No.: 839,916

[22] Filed: Mar. 17, 1986

Related U.S. Application Data

[62] Division of Ser. No. 705,638, Feb. 26, 1985, abandoned.

[30] Foreign Application Priority Data

Feb. 27, 1984 [DE] Fed. Rep. of Germany ....... 3407087

[51] Int. Cl.$^4$ .................. C09K 3/00; B32B 27/36
[52] U.S. Cl. ................... 106/287.19; 427/387; 428/412; 428/447
[58] Field of Search ............ 106/287.19, 287.13; 427/387; 428/447, 412

[56] References Cited

U.S. PATENT DOCUMENTS

| | | | |
|---|---|---|---|
| 3,270,382 | 9/1966 | Emblem et al. | 106/38.3 |
| 3,395,036 | 7/1968 | Campbell | 106/287.19 |
| 3,412,063 | 11/1968 | Jarboe et al. | 106/287.19 |
| 4,378,250 | 3/1983 | Treadway et al. | 106/287.13 |
| 4,405,679 | 9/1983 | Fuloka | 428/447 |

FOREIGN PATENT DOCUMENTS 04973  8/1981  Japan .............. 106/287.13

Primary Examiner—Theodore Morris
Attorney, Agent, or Firm—Oblon, Fisher, Spivak, McClelland & Maier

[57] ABSTRACT

To produce scratch-resistant coatings, a lacquer which has been obtained by hydrolytic polycondensation of at least one titanium or zirconium compound, at least one organofunctional silane and, if appropriate, at least one inorganic oxide component is applied to a substrate and the resulting coating is hardened by heating.

15 Claims, No Drawings

PROCESS AND LACQUER FOR THE PRODUCTION OF SCRATCH-RESISTANT COATINGS

This is a division of application Ser. No. 705,638, filed Feb. 26, 1985 now abandoned.

Numerous articles must be provided with scratch-resistant coatings since their sensitivity towards scratching does not allow them to be used in practice or allows only short periods of use. The known scratch-resistant coating materials usually do not provide adequate improvement, since they either are not sufficiently scratch-resistant or do not have adequate adhesion to the substrate when applied in a suitable coating thickness. In addition, long hardening times are frequently necessary.

The aim of the invention is therefore to provide a process and a lacquer for the production of coatings which have a high scratch-resistance and adhesion to the substrate, and at the same time good optical properties, in particular transparency.

The invention relates to a process for the production of scratch-resistant coatings, which comprises applying to a substrate, and hardening, a lacquer which has been obtained by hydrolytic precondensation of (a) at least one titanium or zirconium compound, which is soluble in the reaction medium, of the formula I $$MR_4 \quad (I)$$

in which M denotes titanium or zirconium and R represents halogen, hydroxyl, alkoxy, acyloxy or a chelating ligand;

(b) at least one organofunctional silane of the formula II $$R_m'(R''Y)_n SiX_{(4-m-n)} \quad (II)$$

in which R' denotes alkyl or alkenyl, R'' represents alkylene or alkenylene, it being possible for these radicals to be interrupted by oxygen or sulfur atoms or —NH— groups, X denotes hydrogen, halogen, hydroxyl, alkoxy, acyloxy or the group —NR'''$_2$ (R'''=hydrogen and/or alkyl), Y is halogen or an optionally substituted amino, amide, aldehyde, alkylcarbonyl, carboxyl, mercapto, cyano, alkoxy, alkoxycarbonyl, sulfonic acid, phosphoric acid, acryloxy, methacryloxy, epoxy or vinyl group and m and n have the value 0, 1, 2 or 3, m+n having the value 1, 2 or 3;

and, if appropriate, at least one oxide, which is soluble in the reaction medium and is difficultly volatile, of an element of main groups Ia to Va or of sub-groups IVb or Vb of the periodic table, with the exception of titanium and zirconium, or at least one compound of one of these elements which is soluble in the reaction medium and forms a difficultly volatile oxide under the reaction conditions;

with a smaller amount of water than the stoichiometrically required amount for complete hydrolysis of the hydrolyzable groups, if appropriate in the presence of a condensation catalyst, and subsequent further condensation by addition of at least the amount of water required to hydrolyze the remaining hydrolyzable groups, and, if appropriate, a condensation catalyst, 5 to 70 mole % of component (a), 30 to 95 mole % of component (b) and 0 to 65 mole % of component (c) being used, based on the total number of moles of the starting components.

The invention furthermore relates to the substrates provided with scratch-resistant coatings in this manner and the lacquers obtainable by precondensation and further condensation.

In the above formulae (I) and (II), radicals R, R', R'', R''', X and Y which are present several times in a compound can in each case have the same meaning or a different meaning.

The alkyl radicals denote, for example, straight-chain, branched or cyclic radicals with 1 to 10 carbon atoms and, in particular, lower alkyl radicals with 1 to 6, preferably 1 to 4, carbon atoms. Specific examples are methyl, ethyl, n-propyl, isopropyl, n-butyl, sec.-butyl, tert.-butyl, isobutyl, n-pentyl, n-hexyl and cyclohexyl.

The alkenyl radicals are, for example, straight-chain, branched or cyclic radicals with 2 to 10 carbon atoms, and in particular lower alkenyl radicals, such as vinyl, allyl and 2-butenyl.

The alkoxy, acyloxy, alkylene, alkenylene, alkylamino, dialkylamino, alkylcarbonyl and alkoxycarbonyl radicals and the substituted amino radicals or amide radicals Y are derived, for example, from the above-mentioned alkyl and alkenyl radicals. Specific examples are methoxy, ethoxy, n- and i-propoxy, n-, sec.- and tert.-butoxy, isobutoxy, $\beta$-methoxyethoxy, acetyloxy, propionyloxy, monomethylamino, monoethylamino, dimethylamino, diethylamino, ethylene, propylene, butylene, methylcarbonyl, ethylcarbonyl, methoxycarbonyl and ethoxycarbonyl.

The radicals mentioned can optionally carry customary substituents, for example halogen atoms, lower alkyl radicals or hydroxyl, nitro or amino groups.

Halogens are preferably fluorine, chlorine and bromine, particularly preferably chlorine.

Specific examples of titanium or zirconium compounds (a) are $TiCl_4$, $ZrCl_4$, $Ti(OC_2H_5)_4$, $Ti(OC_3H_7)_4$, $Ti(O\text{-i-}C_3H_7)_4$, $Ti(OC_4H_9)_4$, $Zr(O\text{-i-}C_3H_7)_4$, $Zr(OC_4H_9)_4$, $Ti(\text{acetylacetonato})_2(O\text{-i-}C_3H_7)_2$, $Zr(\text{acetylacetonato})_4$, $Ti(2\text{-ethylhexoxy})_4$ and other titanium or zirconium complexes with chelating ligands, which are preferably coordinated via oxygen and/or nitrogen.

In the organofunctional silanes (b), the bridge group R'' can optionally be interrupted by oxygen or sulfur atoms or —NH— groups. 2 to 10 recurring structural units are preferably formed in this manner.

Specific examples of organofunctional silanes (b) are:

$CH_3$—Si—$Cl_3$, $CH_3$—Si—$(OC_2H_5)_3$, $C_2H_5$—Si—$Cl_3$,
$C_2H_5$—Si—$(OC_2H_5)_3$, $CH_2$=CH—Si—$(OC_2H_5)_3$,
$CH_2$=CH—Si—$(OC_2H_4OCH_3)_3$, $CH_2$=CH—Si—$(OOCCH_3)_3$,
$(CH_3)_2$—Si—$Cl_2$, $(CH_3)_2$—Si—$(OC_2H_5)_2$,
$(C_2H_5)_2$—Si—$(OC_2H_5)_2$, $(CH_3)(CH_2$=CH)—Si—$Cl_2$,
$(CH_3)_3$—Si—Cl, $(C_2H_5)_3$—Si—Cl, $(t\text{-}C_4H_9)(CH_3)_2$—Si—Cl,
$(CH_3)_2(CH_2$=CH—$CH_2$)—Si—Cl, $(CH_3O)_3$—Si—$C_3H_6$—Cl,
$(C_2H_5O)_3$—Si—$C_3H_6$—$NH_2$, $(C_2H_5O)_3$—Si—$C_3H_6$—CN,
$(CH_3O)_3$—Si—$C_3H_6$—SH, $(CH_3O)_3$—Si—$C_3H_6$—NH—$C_2H_4$—$NH_2$,
$(CH_3O)_3$—Si—$C_3H_6$—NH—$C_2H_4$—NH—$C_2H_4$—$NH_2$,

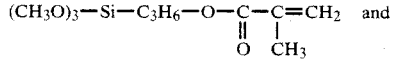

and

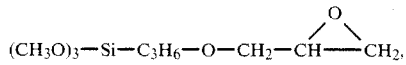

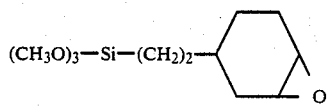

These silanes are commercial products in some cases, or they can be prepared by known methods; cf. W. Noll, "Chemie und Technologie der Silicone" ("Chemistry and Technology of the Silicones"), Verlag Chemie GmbH, Weinheim/Bergstrasse (1968).

Instead of the monomeric starting silanes (b), precondensed oligomers of these silanes which are soluble in the reaction mixture can optionally also be employed; ie. straight-chain or cyclic, low molecular weight partial condensates (polyorganosiloxanes) with a degree of condensation of, for example, about 2 to 100.

Oxides which are soluble in the reaction medium and are difficultly volatile, or compounds which are soluble in the reaction medium and form such difficultly volatile oxides, derived from elements of main groups Ia to Va or sub-groups Ivb or Vb of the periodic table are employed as component (c). The component (c) is preferably derived from the following elements: Na, K, Mg, Ca, B, Al, Si, Sn, Pb, P, As, Sb and/or V, and B, Al, Si, Sn and P are particularly preferred.

Of the difficultly volatile oxides, $B_2O_3$, $P_2O_5$ and $SnO_2$ are particularly preferred.

Compounds which are soluble in the reaction medium and form difficultly volatile oxides are, for example, inorganic acids, such as phosphoric acid and boric acid, and esters thereof. Examples of further suitable compounds are halides, such as $SiCl_4$, $HSiCl_3$, $SnCl_4$ and $PCl_5$, and alkoxides, such as NaOR, KOR, Ca(OR)$_2$, Al(OR)$_3$, Si(OR)$_4$, Sn(OR)$_4$ and VO(OR)$_3$, wherein R is derived from lower alcohols, such as methanol, ethanol, propanol or butanol. Further starting compounds which can be used are corresponding salts with volatile acids, for example acetates, such as silicon tetraacetate, basic acetates, such as basic lead acetate, and formates.

Preferably, 20 to 40 mole % of component (a), 40 to 80 mole % of component (b) and not more than 40 mole % of component (c) are used to prepare the lacquer.

To prepare the lacquer, the starting components are precondensed in the desired mixing ratio with a smaller amount of water than the stoichiometrically required amount for complete hydrolysis of all the hydrolyzable groups employed. This sub-stoichiometric amount of water is preferably metered in such a way that local excessive concentrations are avoided. This is effected, for example, by introducing the amount of water into the reaction mixture with the aid of adsorbents laden with moisture, for example silica gel or molecular sieves, water-containing organic solvents, for example 80 percent strength ethanol, or hydrated salts, foor example $CaCl_2.6H_2O$.

Preferably, the precondensation is carried out in the presence of a condensation catalyst, but in the absence of an organic solvent. If appropriate, however, an organic solvent which is at least partly water-miscible can be employed, for example an aliphatic alcohol, such as ethanol, propanol, isopropanol or butanol, an ether, such as dimethoxyethane, an ester, such as dimethylglycol acetate, or a ketone, such as acetone or methyl ethyl ketone. Any solvent added or formed during the precondensation is preferably not evaporated off, but the reaction mixture is used as such for the further condensation.

Suitable condensation catalysts are compounds which split off protons or hydroxyl ions, and amines. Specific examples are organic or inorganic acids, such as hydrochloric acid, sulfuric acid, phosphoric acid, formic acid or acetic acid, and organic or inorganic bases, such as ammonia, alkali metal or alkaline earth metal hydroxides, for example sodium hydroxide, potassium hydroxide or calcium hydroxide, and amines which are soluble in the reaction medium, for example lower alkylamines or alkanolamines. Volatile acids and bases, in particular hydrochloric acid, ammonia and triethylamine, are particularly preferred here. The total catalyst concentration can be, for example, up to 3 moles/liter.

The precondensation is usually carried out at temperatures from room temperature to 100° C., preferably at room temperature. If an organic solvent is used, the precondensation can also be carried out at temperatures up to the boiling point of the solvent, but in this case also the reaction is preferably carried out at room temperature.

If appropriate, it is possible first to precondense one or more starting components or a portion of one, several or all the starting components, and then to admix the remaining starting components and subsequently to cocondense the components by the precondensation or further condensation method.

The precondensation is continued to the extent that the precondensate formed still has a liquid consistency. Since the resulting precondensate lacquer is sensitive towards hydrolysis, it must be stored with the exclusion of moisture.

The subsequent hydrolytic further condensation of the precondensate is carried out in the presence of at least the amount of water stoichiometrically required to hydrolyze the hydrolyzable groups which still remain, but preferably with more than the stoichiometric amount of water. In an embodiment which is preferred for practical reasons, the amount of water which would be stoichiometrically required for complete hydrolysis of the starting components originally employed is used for the further condensation.

The further condensation is preferably carried out in the presence of one of the abovementioned condensation catalysts, volatile compounds likewise being preferred. The total catalyst concentration can be, for example, up to 5 moles/liter.

If appropriate, one of the abovementioned organic solvents can also be present or added in the further condensation, and solvent formed during the precondensation and further condensation or any solvent added for the precondensation or further condensation is preferably not evaporated off when the further condensation has ended.

The further condensation is usually carried out at temperatures from room temperature to 100° C., preferably room temperature to 80° C. Surprisingly, it has been found that when the resulting lacquer is heated to 40° to 80° C. without the solvent being evaporated off, stabilization of the viscosity of the lacquer is achieved; ie. the viscosity remains essentially constant for a prolonged period after the polycondensation has been carried out.

The precondensate lacquer of the lacquer obtained by further condensation can be used as such. However, if appropriate, it is also possible to add customary lacquer additives, for example organic diluents, flow control agents, colorants (dyestuffs or pigments), UV stabilizers, fillers, viscosity regulators or oxidation inhibitors.

The processing of the lacquers must take place within a certain pot life which is, for example, at least about 1 week for the further condensate according to the abovementioned preferred embodiment. The customary coating processes are used for the coating, for example immersion, flow-coating, pouring, whirler-coating, spraying or brushing on.

Suitable substrates are any desired materials, for example metals, plastics, ceramics, glass or wood. The shape of the substrate can also be chosen as desired. Particularly advantageous results are achieved with plastics which are sensitive to scratching, for example polymethacrylates, polycarbonates and polystyrenes, and in particular with poly(diethylene glycol bis-allyl carbonate).

The coating is applied in coating thicknesses of, for example, 1 to 100 μm, preferably 5 to 50 μm and in particular 10 to 30 μm. If appropriate, the substrate can be primed with a coating of adhesion promoter or primer before application of the coating according to the invention.

The lacquer applied is then hardened by being subjected to heat treatment. In general, heating to a temperature of 150° C., preferably 60° to 130° C., for a few minutes to 1 hour is sufficient for hardening. Only in the case of the precondensate lacquer may somewhat longer hardening times be necessary, for example up to 2 hours.

Because of its sensitivity towards hydrolysis, the precondensate lacquer reacts with atmospheric moisture and can therefore be applied in the same way as a conventional air-drying lacquer.

If the precondensate lacquer or the further-condensed lacquer contains polymerizable groups because of the use of corresponding starting components, the lacquer coating applied can additionally also be hardened photochemically, for example with UV radiation. In this case, photoinitiators are preferably added to the lacquer formulation.

The substrates coated by the process according to the invention have a good scratch-resistance and adhesion between the coating and substrate, it being possible to improve the adhesion to substrates made of plastic by a coating of primer. The coatings are stable to changes in temperature between −20° and +70° C. Because of the good clarity and transparency of the coatings, the process according to the invention is particularly suitable for scratch-resistant coating of optical lenses made of plastic, for example spectacle lenses made of plastic.

The following examples illustrate the invention, without limiting it.

EXAMPLE 1

1,653 g of 3-glycidoxypropyltrimethoxysilane and 684 g of tetraethyl titanate are heated under reflux in 1,500 ml of anhydrous ethanol. 200 ml of anhydrous ethanolic 1N hydrochloric acid are added to the solution and the mixture is heated under reflux for a further 120 minutes, a further 200 ml of anhydrous ethanolic 1N, hydrochloric acid being added after 30, 60 and 90 minutes. The solution is evaporated under a waterpump vacuum at 70° C. and the residue is stirred slowly with 721 ml of water at room temperature. A clear, distinctly more viscous solution is formed, the viscosity of which increases by <100% per day.

This lacquer is, for example, applied by immersion of the substrate and hardened at 100° C. for 60 minutes. Such coatings are clear and transparent; coatings ≧20 μm thick are not scratched by a Vickers diamond under a load of 50 g.

EXAMPLE 2

1,653 g of 3-glycidoxypropyltrimethoxysilane and 684 g of tetraethyl titanate are stirred with 125 g of silica gel, which is laden with 135 g of 0.1N aqueous hydrochloric acid, at rooom temperature for 60 minutes, but at least until no precipitate is formed when one drop of water is added. The silica gel is then filtered off. 721 g of 0.1N aqueous hydrochloric acid are stirred into the clear filtrate at room temperature. A clear, distinctly more viscous solution is formed, the viscosity of which likewise increases by <100% per day.

Similarly scratch-resistant coatings are achieved under the same coating and hardening conditions as in Example 1.

EXAMPLE 3@

1,181 g of 3-glycidoxypropyltrimethoxysilane, 457 g of tetramethoxysilane and 456 g of tetraethyl titanate are stirred with 125 g of silica gel, which is laden with 135 g of 0.001N aqueous hydrochloric acid, at room temperature for 60 minutes, but at least until no precipitate is formed when one drop of water is added. The silica gel is then filtered off. 721 g of 0.001N aqueous hydrochloric acid are stirred into the clear filtrate at room temperature (hydrolysate), and stirring is then continued at room temperature for 2 hours. A clear, distinctly more viscous solution is formed, the viscosity of which increases by <100% per day.

This lacquer is, for example, applied by immersion of the substrate and hardened at 90° C. for 45 minutes. Such coatings are clear and transparent; coatings ≧20 μm thick on polycarbonate are not scratched by a Vickers diamond under a load of 50 g.

EXAMPLE 4

The hydrolysate from Example 3 is stirred at room temperature for a further 2 hours and then diluted with 1,360 g of butanol. The lacquer then has a flow time from the ISO cup of 16 seconds. The lacquer viscosity increases by <70% per day.

This lacquer is, for example, applied by immersion of the substrate and hardened at 90° C. for 45 minutes. If several layers are applied by immersion lacquering, each layer is only superficially dried at 90° C. for 10 minutes; only after the last lacquering step is the coating hardened at 90° C. for 45 minutes. Such coatings are clear and transparent; coatings ≧15 μm thick on poly(-diethylene glycol-bis-allyl carbonate) are not scratched by a Vickers diamond under a load of 50 g and have a good adhesion.

EXAMPLE 5

The hydrolysate from Example 3 is stirred at 70° C. using a reflux condenser for a further 2 hours. A clear, distinctly more viscous solution is formed. After cooling to room temperature, the solution is diluted with 1,360 g of butanol. The lacquer then has a flow time from the ISO cup of 34 seconds. The lacquer viscosity increases by ≦3% per day.

Similarly scratch-resistant coatings are achieved under the same coating and hardening conditions as in Example 4.

EXAMPLE 6

1,181 g of 3-glycidoxypropyltrimethoxysilane, 457 g of tetramethoxysilane and 456 g of tetraethyl titanate are stirred with 125 g of silica gel, which is laden with 135 g of 0.1N aqueous sodium hydroxide solution, at room temperature for 60 minutes, but at least until no precipitate is formed when one drop of water is added. The silica gel is then filtered off. 721 g of water are stirred into the clear filtrate at room temperature, and stirring is then continued at 70° C. using a reflux condenser for 2 hours. A clear, distinctly more viscous solution is formed. After cooling to room temperature, the solution is diluted with 1,300 g of butanol. The lacquer then has a flow time from the ISO cup of 35 seconds. The lacquer viscosity increases by $\leq 5\%$ per day.

Similarly scratch-resistant coatings are achieved under the same coating and hardening conditions as in Example 4.

EXAMPLE 7

1,181 g of 3-glycidoxypropyltrimethoxysilane, 457 g of tetramethoxysilane and 655 g of tetrapropyl zirconate are stirred with 125 g of silica gel, which is laden with 135 g of 0.1N aqueous sodium hydroxide solution, at room temperature for 60 minutes, but at least until no precipitate is formed when one drop of water is added. The silica gel is then filtered off. 721 g of 0.1N aqueous sodium hydroxide solution are stirred into the clear filtrate at room temperature, and stirring is then continued at room temperature for 2 hours. A clear, distinctly more viscous solution is formed, and is finally diluted with 1,360 g of butanol. This lacquer has a flow time from the ISO cup of 35 seconds. The lacquer viscosity increases by $\leq 3\%$ per day.

Similarly scratch-resistant coatings are achieved under the same coating and hardening conditions as in Example 4.

We claim:

1. A process for the production of scratch-resistant transparent coatings, which comprises applying to a substrate, and hardening, a lacquer which has been obtained by hydrolytic precondensation of
   (a) at least one zirconium compound, which is soluble in the reaction medium, of the formula I:

$$MR_4 \qquad (I)$$

in which M denotes zirconium and R represents halogen, hydroxyl, alkoxy, acyloxy or a chelating ligand; and
   (b) at least one organo functional silane of the formula II:

$$R_m'(R''Y)_n SiX_{(4-m-n)} \qquad (II)$$

in which R' denotes alkyl or alkenyl, R'' represents alkylene or alkenylene, wherein said R' or R'' radicals are uninterrupted or are interrupted by oxygen or sulfur atoms or —NH— groups, X denotes hydrogen, halogen, hydroxyl, alkoxy, acyloxy or the group —NR'''$_2$, wherein R''' is hydrogen or alkyl or one of each, Y is halogen or an unsubstituted or substituted amino, amide, aldehyde, alkylcarbonyl, carboxyl, mercapto, cyano, alkoxy, alkoxycarbonyl, sulfonic acid, phosphoric acid, acryloxy, methacryloxy, epoxy or vinyl group; m and n have the value 0, 1, 2 or 3, and m+n have the value 1, 2 or 3, with a smaller amount of water than the stoichiometrically required amount for complete hydrolysis of the hydrolyzable groups; and subsequently further condensing the reaction mixture by adding at least an amount of water required to hydrolyze the remaining hydrolyzable groups.

2. The process as claimed in claim 1, wherein 20 to 40 mole % of component (a), 40 to 80 mole % of component (b) and not more than 40 mole % of component (c), based on the total number of moles of the starting components, have been used to produce the lacquer.

3. The process as claimed in claim 1, wherein the further condensation has been carried out in the presence of an acid or basic condensation catalyst.

4. The process as claimed in claim 1, wherein the amount of water employed for the precondensation has been introduced by means of moisture-containing adsorbents, water-containing organic solvents or hydrated salts.

5. The process as claimed in claim 1, wherein the lacquer coating applied is hardened by heat treatment at a temperature up to 150° C., preferably at 60° to 130° C.

6. The process as claimed in claim 1, wherein customary lacquer additives, such as organic diluents, flow control agents, colorants, UV stabilizers, fillers, viscosity regulators or oxidation inhibitors, are incorporated in the lacquer.

7. A lacquer for scratch-resistant transparent coatings, produced by hydrolytic precondensation of
   (a) at least one zirconium compound, which is soluble in the reaction medium, of the formula I:

$$MR_4 \qquad (I)$$

in which M denotes zirconium and R represents halogen, hydroxyl, alkoxy, acyloxy or a chelating ligand; and
   (b) at least one organo functional silane of the formula II:

$$R_m'(R''Y)_n SiX_{(4-m-n)} \qquad (II)$$

in which R; denotes alkyl or alkenyl, R'' represents alkylene or alkenylene, wherein said R' or R'' radicals are uninterrupted or are interrupted by oxygen or sulfur atoms or —NH— groups, X denotes hydrogen, halogen, hydroxyl, alkoxy, acyloxy or the group —NR'''$_2$ wherein R''' is hydrogen or alkyl or one of each, Y is halogen or an unsubstituted or substituted amino, amide, aldehyde, alkylcarbonyl, carboxyl, mercapto, cyano, alkoxy, alkoxycarbonyl, sulfonic acid, phosphoric acid, acryloxy, methacryloxy, epoxy or vinyl group; m and n have the value 0, 1, 2 or 3, and m+n have the value 1, 2 or 3, with a smaller amount of water than the stoichiometrically required amount for complete hydrolysis of the hydrolyzable groups.

8. A lacquer as claimed in claim 7, in which the amount of water employed for the precondensation has been introduced by means of moisture-containing adsorbents, water-containing organic solvents or hydrated salt.

9. A lacquer as claimed in claim 7, which has been further condensed by addition of at least the amount of water required for hydrolysis of the remaining hydrolyzable groups and, if appropriate, a condensation catalyst.

10. A lacquer as claimed in claim 7, which contains the customary laquer additives, such as organic diluents, flow control agents, colorants, UV stabilizers, fillers, viscosity regulators or oxidation inhibitors.

11. The process as claimed in claim 1, which further comprises adding at least one oxide, which is soluble in the reaction medium and is relatively non-volatile, of an element of main groups Ia to Va or sub-groups IVb or Vb of the periodic table, with the exception of zirconium, or at least one compound of one of these elements which is soluble in the reaction medium and forms a relatively non-volatile oxide under the reaction conditions.

12. A lacquer as claimed in claim 7, which further comprises at least one oxide, which is soluble in the reaction medium and is relatively non-volatile, of an element of main groups Ia to Va or sub-groups IVb or Vb of the periodic table, with the exception of zirconium, or at least one compound of one of these elements which is soluble in the reaction medium and forms a relatively non-volatile oxide under the reaction conditions.

13. The process as claimed in claim 1, wherein said compound having the formula I is tetrapropyl zirconate and said compound having the formula II is 3-glycidoxypropyltrimethoxysilane.

14. The lacquer as claimed in claim 7, wherein said compound having the formula I is tetrapropyl zirconate and said compound having the formula II is 3-glycidoxypropyltrimethoxysilane.

15. The process as claimed in claim 1, wherein said substrate is a plastic optical lens.

* * * * *